Feb. 24, 1970   A. FERRI ET AL   3,496,725
ROCKET ACTION TURBOFAN ENGINE
Filed Nov. 1, 1967   5 Sheets-Sheet 1
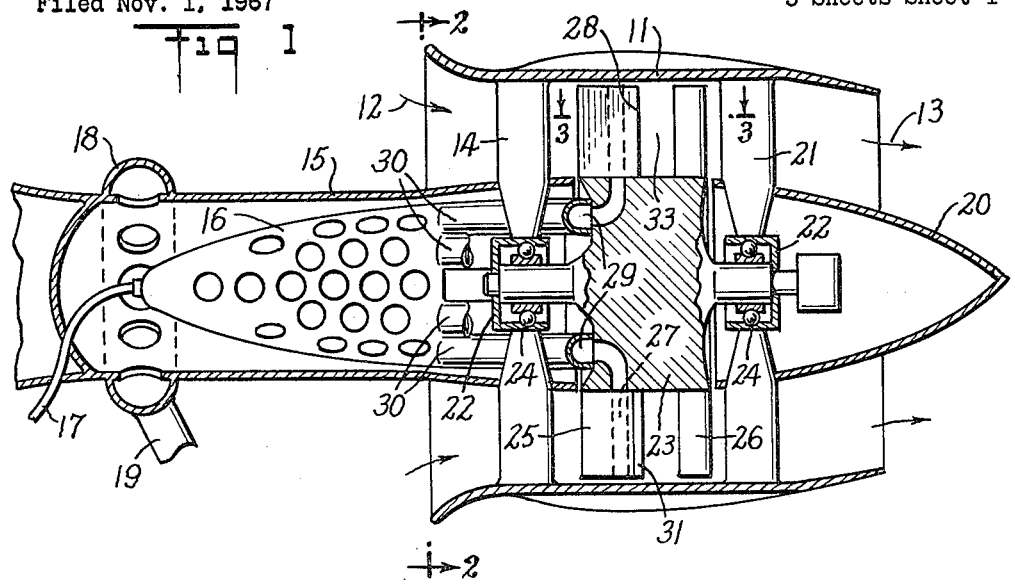
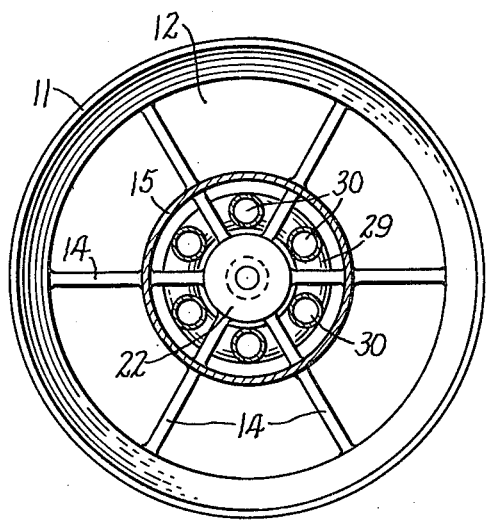
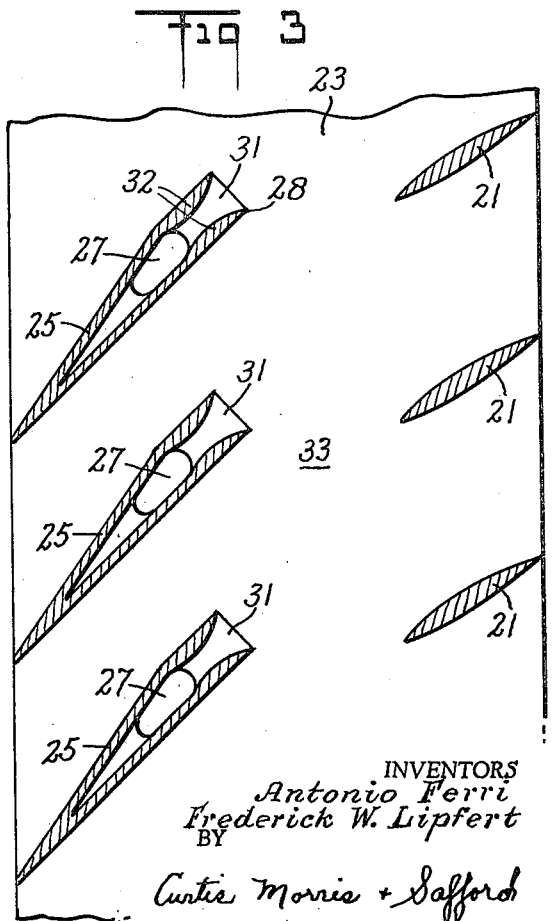
INVENTORS
Antonio Ferri
Frederick W. Lipfert
BY
Curtis, Morris & Safford
ATTORNEYS

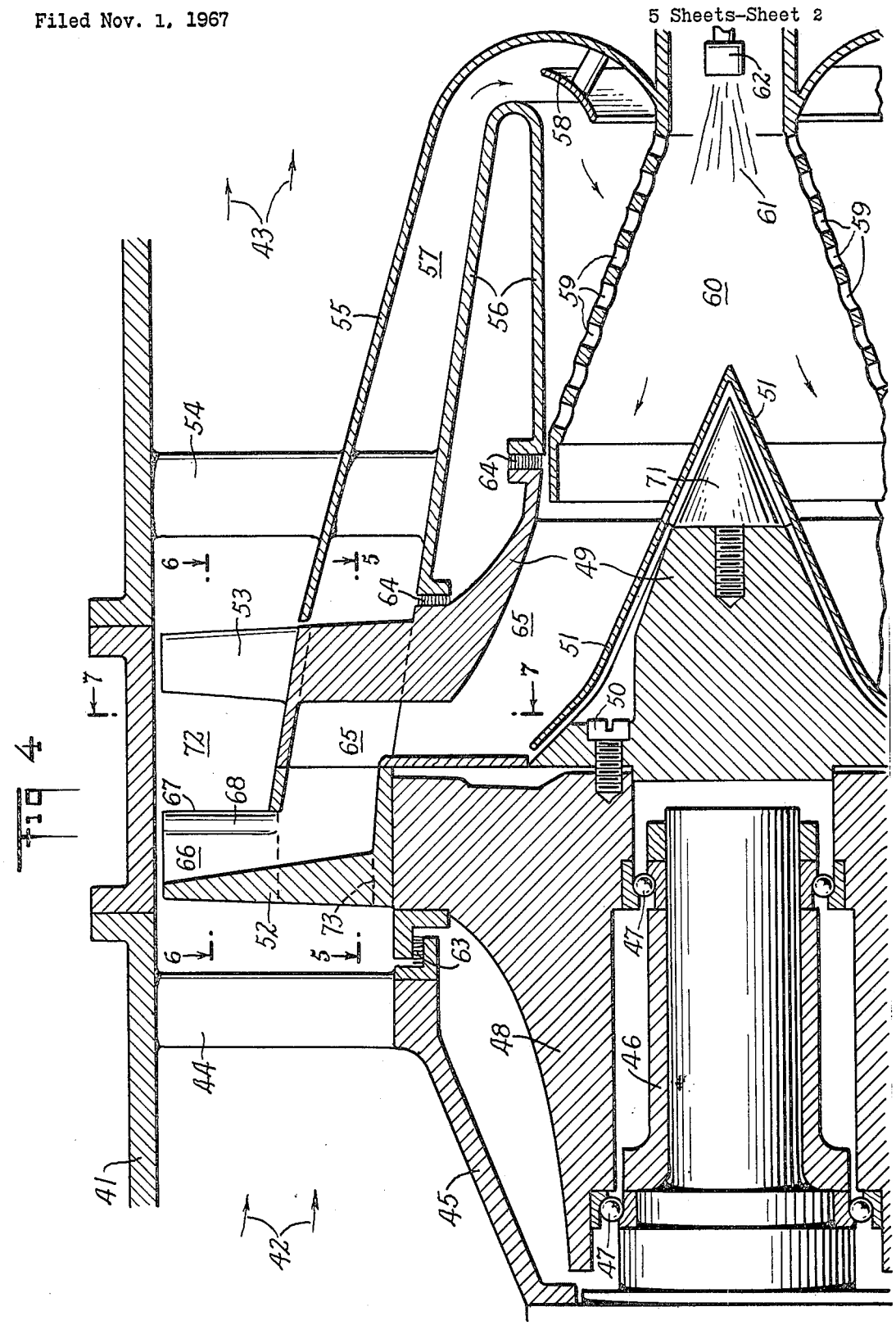

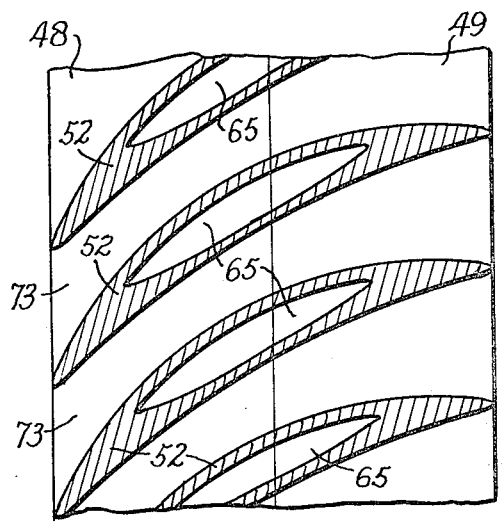
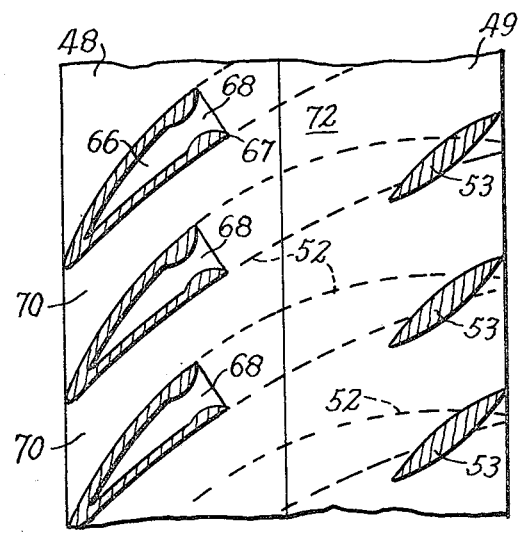
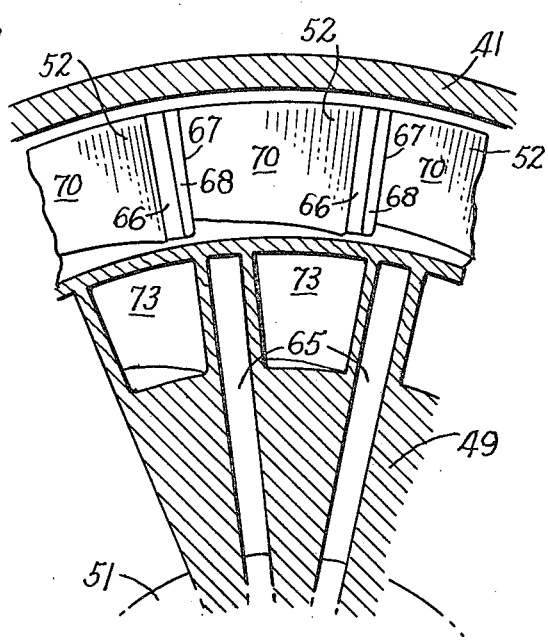

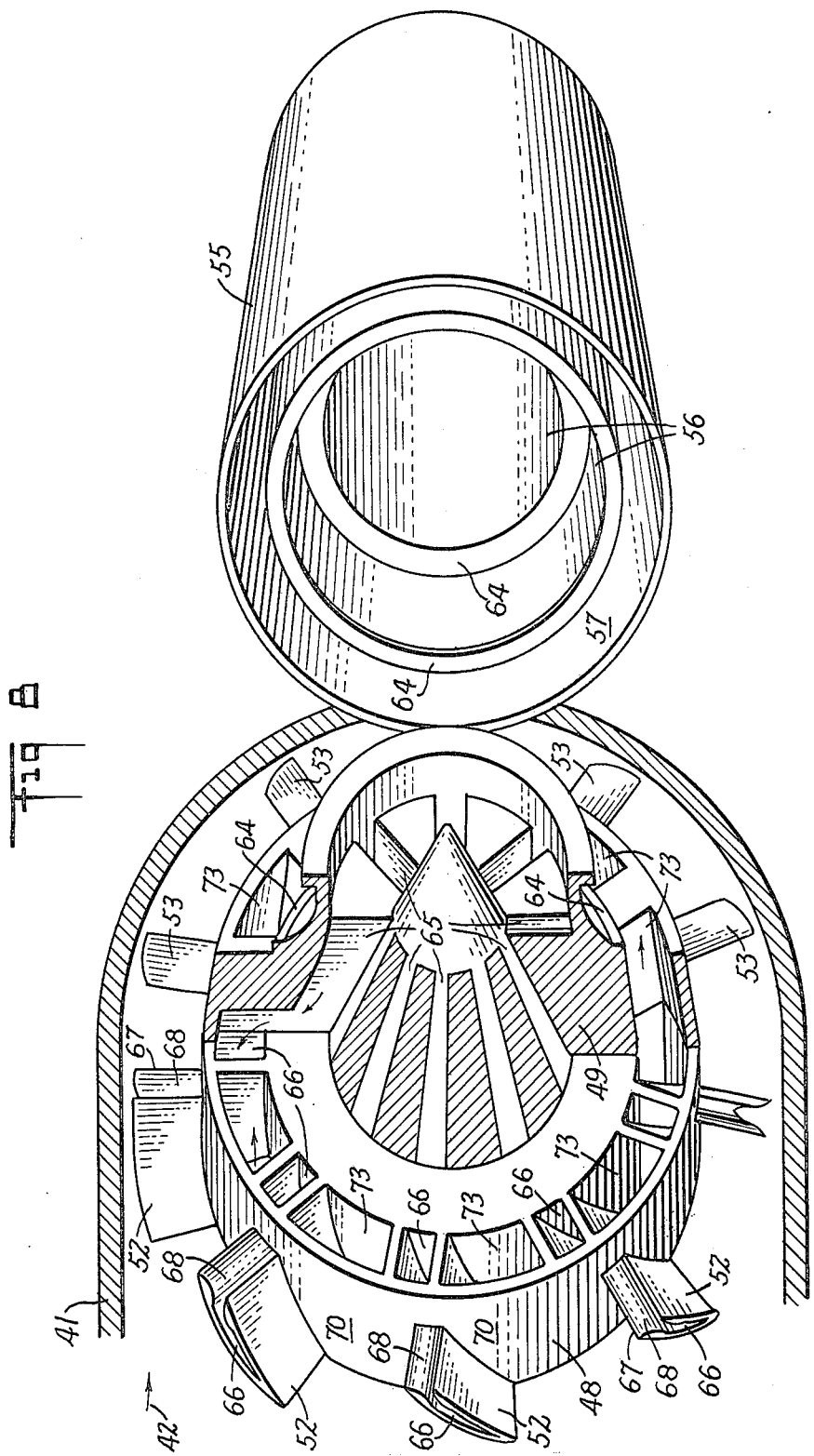

Feb. 24, 1970    A. FERRI ET AL    3,496,725
ROCKET ACTION TURBOFAN ENGINE
Filed Nov. 1, 1967    5 Sheets-Sheet 5
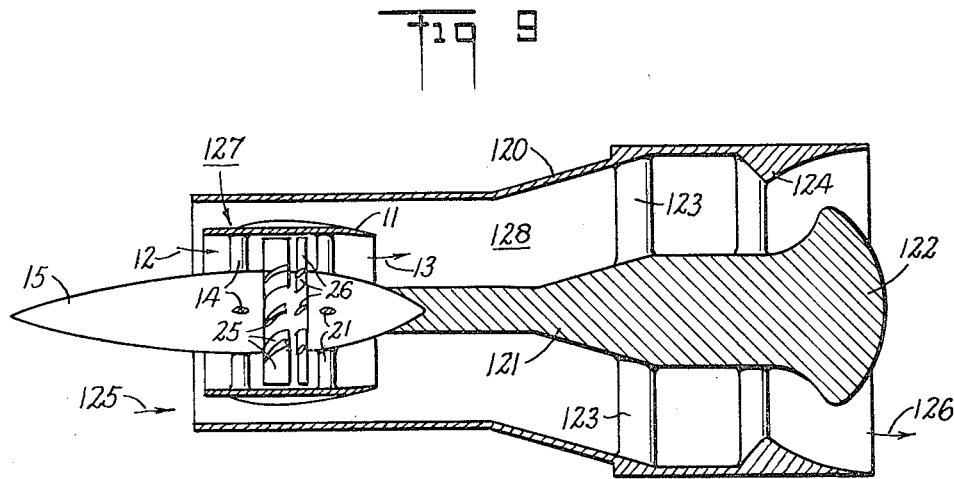
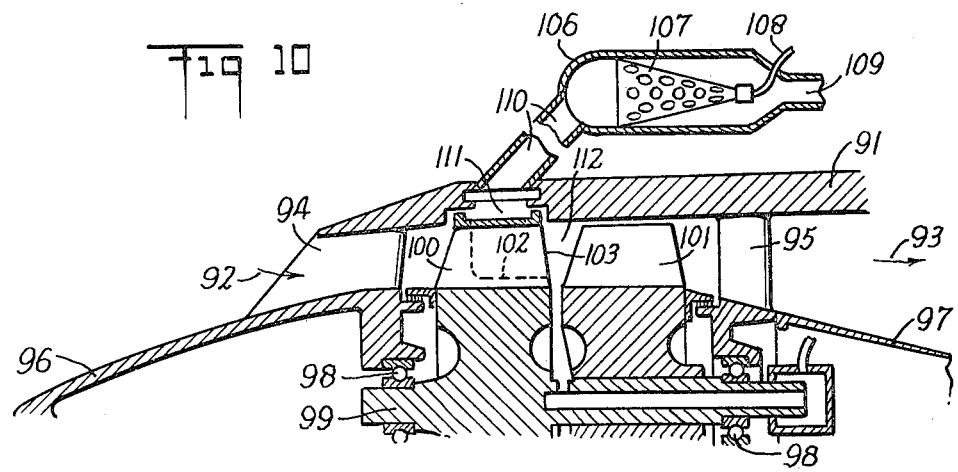

United States Patent Office 3,496,725
Patented Feb. 24, 1970

3,496,725
ROCKET ACTION TURBOFAN ENGINE
Antonio Ferri, Rockville Centre, and Frederick W. Lipfert, Northport, N.Y., assignors to General Applied Science Laboratories, Inc., Westbury, N.Y., a corporation of New York
Filed Nov. 1, 1967, Ser. No. 679,800
Int. Cl. B63h *11/00;* F02k *1/02, 3/02*
U.S. Cl. 60—204
10 Claims

ABSTRACT OF THE DISCLOSURE

A gas turbine power plant including a turbo compressor injecting a high-temperature high-pressure auxiliary fluid into a stream of primary fluid being compressed. The compressor is driven by partial expansion of the auxiliary gas, which imparts fluid shear energy to the primary fluid on admixture therewith. Expansion of the mixed fluids provides thrust.

---

This invention relates to gas turbine power plants and to methods of generating turbo-propulsive power. In particular, the present invention relates to devices and methods utilizing the expansion energy of an auxiliary high-temperature high-pressure fluid to drive a compressor. After expansion, the driving fluid is mixed with the primary fluid pumped by the compressor and the mixture is further expanded to produce propulsive power. Still more in particular, the present invention relates to devices and methods in which an auxiliary high-temperature high-pressure fluid is injected from the blades of a compressor rotor into a stream of primary fluid, serving to increase the velocity of the primary fluid relative to the rotor by means of viscous entrainment.

It can be shown by reference to vector diagrams of a type commonly used in the analysis of turbomachinery that in a device of the type just described in which hot gases are injected from the trailing edges of compressor rotor blades into a stream of primary air, the net energy added per pound of flow is the difference between the product of the peripheral velocity of the rotor and the tangential velocity of the air flow in stationary coordinates (relative to the engine mount or vehicle) at the rotor, exit station and the product of the peripheral velocity of the rotor and the tangential velocity in stationary coordinates at the rotor entry station. Symbolically, $$E = U_2 V_{2u} - U_1 V_{1u}$$

where the subscript 2 indicates the exit station, subscript 1 denotes the entry station, U is the peripheral velocity, V is velocity in stationary coordinates, and subscript $u$ denotes an upstream tangential component. If the velocity of the air relative to the rotor at the exit station is chosen at a fixed magnitude, the relative discharge angle can be used to determine whether the rotor functions as a compressor (E greater than 0), a turbine (E less than 0), or free-wheels (E=0).

The net thrust, F, produced by a rotor of this type is expressed mathematically as $$F = \dot{w}_a(V_{2x} - V_0) + \dot{w}_g V_{2x} + A(P_2 - P_0)$$

where: A=cross-sectional area; P=static pressure; V=velocity in stationary coordinates (relative to the engine mount or vehicle); and $\dot{w}$=mass rate of flow. The subscripts have the following meaning: 0=free stream (ambient); 2=exit station; x=axial component; a=air; and g=hot gas injected from the blade trailing edges.

Thus, it is possible to produce a net thrust by means of a single rotating component driven by a suitable source of high temperature high-pressure gas ($\dot{w}_g$).

Expressed in non-mathematical terms, the present invention utilizes the energy released by partial expansion of a high-temperature, high-pressure gas to drive an impeller compressing a source of primary fluid, admixes the partially expanded auxiliary fluid with the primary fluid to impart fluid shear energy by means of momentum exchange and to increase the relative velocity of the gases within the rotor, and then expands the mixed fluids to provide turbo-propulsive power. Additional combustion is a secondary feature and may or may not take place within the rotor prior to final expansion.

The gas turbine power plants of the present invention can be used alone as the prime mover for propelling aircraft or other vehicles, or can be used in combination with other propulsive means, such as a ramjet engine.

A better understand of the present invention and of its many advantages will be had by referring to the accompanying drawings, in which FIG. 1 is a side view in section of one embodiment of a gas turbine power plant according to the invention;

FIG. 2 is a front view of the power plant of FIG. 1, taken in section along line 2—2 of FIG. 1;

FIG. 3 is a plan view showing details of the blading of the power plant of FIG. 1, taken in section along line 3—3 of FIG. 1;

FIG. 4 is a side view in section of another embodiment of a gas turbine power plant according to the invention;

FIG. 5 is a plan view showing details of the blading of the power plant of FIG. 4, taken in section along line 5—5 of FIG. 4;

FIG. 6 is another plan view showing details of the blading of the power plant of FIG. 4, taken in section along line 6—6 of FIG. 4;

FIG. 7 is a rear view of a portion of the power plant of FIG. 4, taken in section along line 7—7 of FIG. 4;

FIG. 8 is an exploded view of the power plant of FIG. 4, partly in section, showing further details of the interior structure of said power plant;

FIG. 9 is a side view in section of a ramjet rocket employing a gas-turbine power plant according to the present invention as a propulsive stage therein;

FIG. 10 is a side view in section of still another embodiment of a gas turbine power plant according to the present invention; and FIG. 11 is a perspective view, partly in section, of details of the bladed rotor of the power plant of FIG. 10.

FIG. 1 shows a gas turbine power plant according to the present invention comprising cowling or nacelle 11 having inlet means 12 for the intake of a stream of primary (atmospheric) air and outlet means 13 for discharge of said air stream after mixing with high-temperature high-pressure gases according to the present invention. Supported in central portions of cowling 11 by forward support struts 14 is forward axial housing 15 including therein combustion chamber 16 provided with inlet 17 for suitable gaseous or liquid fuel. Surrounding forward axial housing 15 is annular manifold 18 in communication through conduit 19 with a source of high pressure air.

In aft portions of cowling 11 rearward support struts 21 support rearward axial housing 20. Support struts 14 and 21 also support bearing housings 22 on the longitudinal axis of cowling 11. Rotor or impeller 23 is rotatably mounted in said bearing housings 22 on bearings 24.

Rotor or impeller 23 is provided with a plurality of forward (injector) blades 25 and a plurality of aft (discharge) blades 26. As is best seen from FIG. 3, forward blades 25 are provided with a hot gas conduit 27 in interior portions thereof, which conduit is in communication with trailing edge 28 of forward blades 25.

Each hot gas conduit 27 of forward blades 25 extends into rotor 23 and is in constant communication therein with annular manifold 29. In turn, annular manifold 29 is in communication with combustion chamber 16 through plurality of connecting conduits 30.

To operate the gas turbine power plant of FIG. 1, high pressure air is introduced through conduit 19 and manifold 18 into combustion chamber 16 where it is combined with fuel introduced through inlet 17 and partially or completely combusts said fuel. High-temperature high-pressure gases pass from combustion chamber 16 through connecting conduits 30 into annular manifold 29 and thence continually into plurality of hot gas conduits 27 in corresponding plurality of forward (injector) blades 25. The hot gases from each conduit 27 are suitably discharged through nozzle throat 31 defined in trailing edge 28 of individual blades 25 by nozzle means 32.

The hot gases discharged through discharge orifices 31 are mixed within the rotor in annular space 33 with primary air entering inlet means 12, where momentum is exchanged. If fuel introduced at 17 has been incompletely combusted with air within combustion chamber 16, combustion of the fuel is completed by primary air at 33. The resultant mixed gases now pass to aft (discharge) blades 26 where expansion and discharge of the mixed gases provide propulsive thrust and shaft power for driving rotor or impeller 23. The orientation of the trailing surface of blades 26 is such as to provide the proper tangential velocity component so that no further shaft power is required to drive the impeller. That is, the axial component of the discharge gas velocity vector provides thrust: the tangential component drives the rotor.

FIGURES 4–8 of the drawings show various aspects of another embodiment of a gas turbine power plant according to the present invention, which embodiment utilizes a portion of an atmospheric air stream in generating a high-temperature high-pressure auxiliary fluid. FIGURE 4, which is a side view in section of a portion of such a gas turbine power plant, shows cowling or nacelle 41 having inlet means 42 for primary air and outlet means 43 for a mixed air stream. Forward support struts 44 support forward axial housing 45 in central portions of cowling or nacelle 41. Within forward axial housing 45 is bearing housing 46 in which bearings 47 are mounted. Supported by bearings 47 is a rotor or impeller comprising forward portion 48 and aft portion 49 affixed thereto by means such as bolts 50. Portion 49 is provided with heat shield 51 affixed thereto by means such as support means and bolt 71.

Rotor 48–49 is provided with plurality of forward (injector) blades 52 attached to 48, and with plurality of aft (discharge) blades 53 integrally attached to portion 49.

Aft support struts 54 support exterior aft axial housing 55 and interior aft axial housing 56 in central portions of cowling 41. Exterior and interior aft axial housings 55 and 56 define therebetween annular gas passage 57, suitably provided with deflector means 58 for guiding a stream of gas flowing therethrough. Annular passage 57 is in communication with circular combustion chamber 60 through a plurality of perforations 59. Fuel 61 is introduced into combustion chamber 60 by fuel injector means 62.

Rotor 48–49 is sealed within forward axial housing 45 and rear axial housings 55 and 56 by forward ring sealing means 63 and aft ring sealing means 64. As is best seen from FIGS. 7 and 8, rotor 48–49 has a first plurality of passages 65 therein, which passages 65 are in communication with combustion chamber 60 and terminate in plurality of hot gas conduits 66 in forward (injector) blades 52. Forward blades 52, at their periphery adjacent cowling 41, define first plurality of air passages 70 therebetween. At their extremities closest the longitudinal axis of rotor 48–49, blades 52 define therebetween second plurality of air passages 73. Passages 73 are in communication with annular passage 57 defined by exterior and interior aft axial housings 55 and 56. Conduits 66, however, are in communication with combustion chamber 60 through passages 65 within rotor 48–49.

As best seen from FIGS. 5 and 6, each blade 52 is suitably provided with nozzle throat 68 at trailing edge 67 thereof to increase the thrust generated by hot gas discharge therethrough.

Thus, in the gas turbine power plant shown in FIGS. 4–8, atmospheric air entering forward air inlet means 42 is divided into two streams, one of which passes through passages 70 in peripheral portions of blades 52 and is ultimately discharged through outlet means 43. A second portion of the stream enters passages 73 into annular passage 57 where it is compressed, deflected by deflector means 58 through perforations 59, and admixed with fuel 61 in combustion chamber 60. The resulting fully or partially combusted mixture of fuel and air then passes through passages 65 in rotor 48–49 to hot gas conduits 66 in forward injector blades 52 and leaves nozzle throats 68 in trailing edges 67 of blades 52. In annular space 72 (FIG. 4) defined between forward injector blades 52 and aft discharge blades 53, the fully or partially combusted gas mixture exiting through nozzle throats 68 of blades 52 is admixed with atmospheric air entering through passages 70. This increases the relative velocity of the air by means of fluid shear energy imparted by the injected hot gases (momentum exchange), and effects further combustion of fuel 61 if complete combustion has not already taken place. The mixed hot gases then pass over aft discharge blades 53 and are discharged at 43. The expansion of the mixed hot gases provides propulsive energy and shaft power for impeller 48–49.

Although the gas-turbine power plants of the present invention can be employed alone as a source of propulsive power for propelling vehicles such as aircraft, they may also be used in combination with other known propulsive means. FIG. 9 is a side sectional view of a ram-jet rocket utilizing a power plant of the present invention as a stage therein. FIG. 9 shows an engine comprising outer casing 120 having mounted in forward portions thereof a gas-turbine power plant according to the present invention, generally indicated as 127. For purposes of illustration, a power plant similar to that shown in FIG. 1 of the drawings is shown mounted in casing 120. In FIG. 9, nacelle 11, air intake 12, exit 13, forward axial housing 15, forward and aft support struts 14 and 21, forward blades 25, and aft blades 26 are shown. Further centrally supported within casing 120 is conventional ram-jet core means 121 including exhaust nozzle plug 122. The ram-jet features of the device shown in FIG. 9 also include flame holder means 123, constricted throat means 124, and inlet and outlet means 125 and 126 respectively defining an airstream through casing 120.

In operation, the gas turbine power plant stage of the device shown in FIG. 9 is utilized to bring the device from a starting velocity, which may be zero velocity, to a velocity sufficient for the device to function as a ramjet. During this period, the hot gases discharging at 13 entrain and draw in atmospheric air at 125 in the manner of an air-augmented rocket.

In certain embodiments, the high-temperature high-pressure auxiliary fluid discharged from the trailing edges of blades 25 may consist wholly or largely of uncombusted rocket propellants which exchange momentum and are mixed with atmospheric air and burned on discharge from the blades.

After sufficient flight velocity has been reached, air inlet 12 may be closed by suitable means (not shown) and the device of FIG. 9 operated as a conventional ramjet. For ramjet operation, rammed air entering inlet means 125 is admixed with fuel in annular volume 128. The mixture burns at flame holder 123 and the resultant hot gases pass through the constricted exit means defined by exhaust nozzle plug 122 and throat means 124 for discharge at 126. The fuel admixed with rammed air in annular volume 128 can suitably be injected from the fuel injector means of the gas turbine power plant mounted in forward portions of the ram-jet rocket. These fuel injection means are not shown in detail in FIG. 9, but may be like those shown in the embodiments of gas-turbine power plants of the earlier figures.

FIGS. 10 and 11 show still another embodiment of a power plant according to the present invention, in which embodiment high-temperature high-pressure gas is introduced into the blades of a gas-turbine power plant rotor at peripheral portions thereof and is then discharged through the trailing edges of the rotor blades for admixture with primary air entering the gas turbine power plant. In particular, FIGS. 10 and 11 show a gas turbine power plant comprising cowling or nacelle 91 having inlet means 92 for primary air and exit means 93 for a stream of mixed gases. Forward struts 94 and rearward struts 95 respectively support forward central axial housing 96 and aft central axial housing 97. Within housings 96 and 97 bearing means 98 rotatably support rotor 99 having a plurality of forward (injector) blades 100 and a plurality of aft (discharge) blades 101.

As is best seen in FIG. 11, each of blades 100 is provided with interior passage 102 (shown by dotted lines in FIG. 10) in communication at trailing edge 103 of blades 100 with nozzle throat 104.

Adjacent cowling 91, interior passages 102 of blades 100 are in communication with source 106 of high-temperature high-pressure auxiliary fluid. Source 106 comprises combustion chamber 107 having fuel inlet means 108 and in communication through conduit 109 with a source of high-pressure air. High-pressure high-temperature gases generated within source 106 by complete or partial combustion of fuel introduced through inlet 107 are conducted through conduit 110 into manifold 111. From manifold 111, the high-temperature high-pressure gases enter interior passages 102 of blades 100 and are subsequently discharged through nozzle throats 104 into annular volume 112 defined between forward blades 100 and aft blades 101. In annular volume 112, the high-temperature high-pressure auxiliary gases are admixed with atmospheric air entering inlet means 92, thereby increasing the temperature, momentum, and velocity of the air prior to subsequent expansion and discharge of the mixed gases through aft blading 101 and exit means 93 to generate propulsive power.

What is claimed is:

1. In a gas turbine power plant having a housing including forwardly directed inlet means for intake of a stream of primary fluid and rearwardly directed outlet means for discharge thereof, the combination of:
   (A) a turbo-compressor including an impeller having a first plurality of forward blades and a second plurality of aft blades mounted on a common shaft, said forward blades having inlet means for the receipt of a high-temperature, high-pressure auxiliary fluid in a gaseous state and outlet means for its downstream ejection into and mixing with said stream of primary fluid, said aft blades being mounted on said shaft sufficiently downstream from said forward blades to define therebetween a region of mixing and momentum interchange between said primary and auxiliary fluids, said aft blades further being oriented to produce net thrust and to drive said impeller without additional shaft power being supplied thereto;
   (B) a source of high-temperature, high-pressure auxiliary fluid; and
   (C) conduit means communicating between said source of auxiliary fluid and said forward blade inlet means.

2. A gas turbine power plant as in claim 1 wherein said forward blade inlet means are in communication with said source of high-temperature high-pressure auxiliary fluid in hub portions of said blades.

3. A gas turbine power plant as in claim 1 wherein said forward blade inlet means are in communication with said source of high-temperature high-pressure auxiliary fluid in tip portions of said blades.

4. A gas turbine power plant as in claim 1 wherein said source of high-temperature high-pressure auxiliary fluid is a combustion chamber for combusting fuel in admixture with compressed air.

5. A gas turbine power plant as in claim 4 wherein air for said combustion chamber is diverted from a stream of primary air entering said power plant, is compressed by said turbo-compressor, and is then passed to said combustion chamber.

6. In a gas turbine power plant having a housing including forwardly directed inlet means for intake of a stream of primary fluid and rearwardly directed outlet means for discharge thereof,
   (A) an axially mounted turbo-compressor including an impeller having a hub and a first plurality of forward blades and a second plurality of aft blades mounted thereon, said forward blades defining therebetween in peripheral portions thereof a first plurality of passages for a first portion of said primary fluid stream, said passages communicating directly between said forward inlet means and said rearward outlet means, said hub further having therein a second plurality of passages for a second portion of said primary fluid stream;
   (B) an axial combustion chamber having fuel supply means and conduit means in communication with said second plurality of passages for admission of a portion of said primary fluid into said combustion chamber;
   (C) inlet means in hub portions of said forward blades for receiving high-temperature high-pressure auxiliary fluid from said combustion chamber and nozzled outlet means in the trailing edges of said forward blades for its discharge; and
   (D) conduit means communicating through said impeller hub between said combustion chamber and said inlet means in hub portions of said forward blades.

7. In a gas turbine power plant having a housing including forwardly directed inlet means for intake of a stream of primary fluid and rearwardly directed outlet means for discharge thereof,
   (A) an axially mounted turbo-compressor including an impeller having a hub and a first plurality of forward blades and a second plurality of aft blades mounted thereon to define, between said forward and aft blades, a region of fluid mixing and momentum interchange, said aft blades further being oriented to produce net thrust and to drive said impeller without additional shaft power being supplied thereto;
   (B) an axial source of high-temperature, high-pressure auxiliary fluid in a gaseous state;
   (C) inlet means in hub portions of said forward blades for receiving said auxiliary fluid and nozzled outlet means in the trailing edges of said forward blades for its downstream discharge into and mixing with said stream of primary fluid; and
   (D) conduit means, including manifold means, communicating through said impeller hub between said axial source of auxiliary fluid and said inlet means in hub portions of said forward blades.

8. In a gas turbine power plant having a housing including forwardly directed inlet means for intake of a stream of primary fluid and rearwardly directed outlet means for discharge thereof,
   (A) an axially mounted turbo-compressor including an impeller having a hub and a first plurality of forward blades and a second plurality of aft blades mounted thereon to define, between said forward and aft blades, a region of fluid mixing and momentum interchange, said aft blades further being oriented to produce net thrust and to drive said impeller without additional shaft power being supplied thereto;

(B) a source of high-temperature, high-pressure auxiliary fluid in a gaseous state;

(C) inlet means in tip portions of said forward blades for receiving said auxiliary fluid and nozzled outlet means in the trailing edges of said forward blades for its downstream discharge into and mixing with said stream of primary fluid; and (D) conduit means including manifold means circumferentially arranged about said turbo-compressor communicating between said source of auxiliary fluid and said inlet means in tip portions of said forward blades.

9. In the method of generating turbopropulsive power by compressing a primary fluid in a compression stage, mixing the primary fluid with an auxiliary high-temperature, high-pressure propulsive fluid consisting of gaseous combustion products, and then expanding the mixed fluids to provide thrust, the improvement comprising partially expanding said auxiliary fluid, prior to mixing with the primary fluid, to provide a portion of the energy needed for driving said compression stage, and further expanding the mixed primary and auxiliary fluids to provide further energy for driving said compression stage and to provide axial thrust.

10. In the method of generating turbopropulsive power by compressing a primary fluid in a compression stage, mixing the primary fluid with an auxiliary high-temperature, high-pressure propulsive fluid in the gaseous state, and then expanding the mixed fluids to provide thrust, the improvement comprising partially expanding said auxiliary fluid, prior to mixing with the primary fluid, to provide a portion of the energy needed for driving said compression stage, mixing said auxiliary and primary fluids without combustion, and further expanding the mixed primary and auxiliary fluids to provide further energy for driving said compression stage and to provide axial thrust.

References Cited
UNITED STATES PATENTS

| | | | |
|---|---|---|---|
| 2,557,131 | 6/1951 | Miller | 230—116 |
| 2,784,551 | 3/1957 | Karlby | 230—120 |
| 2,823,516 | 2/1958 | Schelp | 60—264 |
| 3,191,377 | 6/1965 | Hiersch | 230—116 |
| 3,241,310 | 3/1966 | Hoadley | 60—267 |
| 3,269,120 | 8/1966 | Sabatiuk | 60—226 |

MARK M. NEWMAN, Primary Examiner

DOUGLAS HART, Assistant Examiner

U.S. Cl. X.R.

60—262, 269, 39.43; 230—116